Sept. 20, 1960  K. B. WALZ  2,953,024
BAROMETER
Filed Jan. 17, 1956  6 Sheets-Sheet 1

Inventor:
Karl Bernhard Walz
by: Michael S. Striker
Attorney

Sept. 20, 1960    K. B. WALZ    2,953,024
BAROMETER
Filed Jan. 17, 1956    6 Sheets-Sheet 2
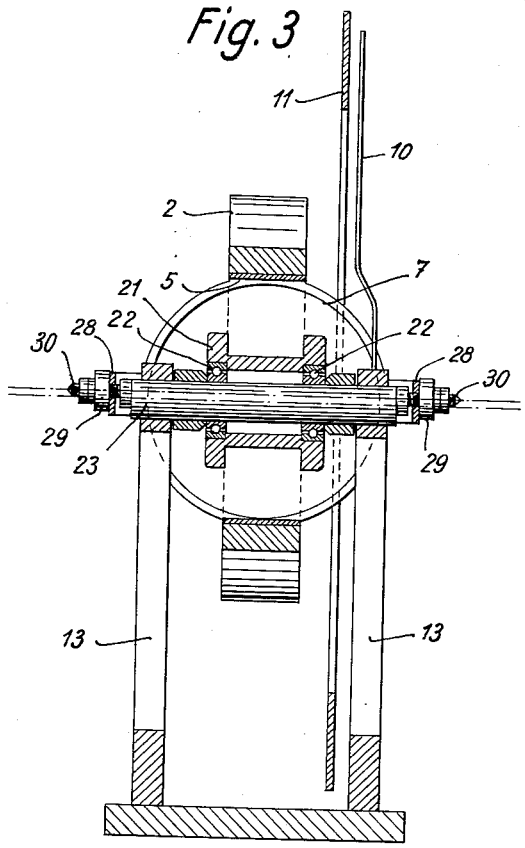
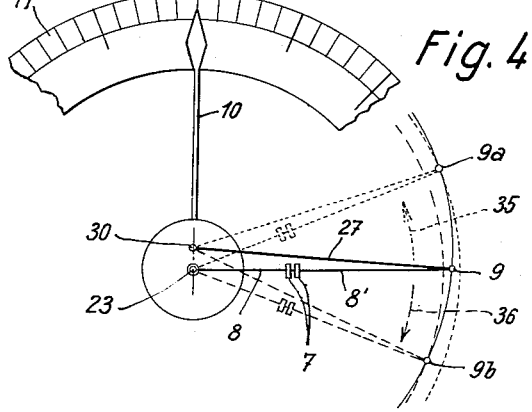

Sept. 20, 1960 K. B. WALZ 2,953,024
BAROMETER
Filed Jan. 17, 1956 6 Sheets-Sheet 5

United States Patent Office 2,953,024
Patented Sept. 20, 1960

2,953,024
BAROMETER
Karl Bernhard Walz, Lerchenrain 15, Rammersweier uber Offenburg, Baden, Germany
Filed Jan. 17, 1956, Ser. No. 559,740
Claims priority, application Germany Jan. 18, 1955
19 Claims. (Cl. 73—384)

The present invention relates to improvements in barometers.

It is an object of the present invention to provide a barometer in the form of balance scales designed to oscillate within a vertical plane so as to attain a state of balance, and wherein one-half of the scale beam contains a pressure-responsive element such as, for example, a barometric bellows, aneroid, or the like.

An important feature of the invention is the fact that the rotary movement of the members forming the scale beam which registers the variations in atmospheric pressure is produced by a pair of rods or the like which are disposed at an acute angle to each other within one-half of the scale beam, the vertex of both beams then forming the means of mounting the same at their outer end on the respective part of the scale beam.

Another object of the invention is to make one of these rods adjustable in length by the provision therein of one or more barometric bellows, aneroids or the like, and to mount and support the inner end of such rod on the rotary axis of the scale beam, while the other rod is of normally constant length and mounted at its inner end at a point which is disposed eccentrically to the rotary axis of the scale beam. The position and manner of mounting the two rods at their inner end may, however, also be reversed.

A barometer as designed according to the present invention has considerable advantages over a metallic barometer of customary design, as well as over a mercury barometer. This is partly due to the fact that all rotatable parts of the new barometer may be mounted on ball bearings on a single shaft, as a result of which the highest possible sensitivity and indicating accuracy will be obtained.

Another important advantage of the barometer according to the invention is the fact that the entire indicating mechanism will operate practically without friction, and that it may be designed so as to operate at any desired transmission ratio.

A further object and feature of the invention consists in providing at least that part of the new barometer which contains the mentioned rods which effect the adjustment of the barometer in the form of a ring-shaped member, and in connecting the two rods at their outer end to the ring-shaped member by means of a resilient element rather than directly by a positive connection.

Another feature of the invention for carrying out the last-mentioned object consists in making such resilient mounting element in the form of a band-shaped steel spring of a diameter larger than that of the inner wall of the ring-shaped member and fitted into such inner wall so that the steel spring will bulge inwardly at one point, such bulge then serving as a means for connecting the rod carrying the aneroids with the ring-shaped member.

In a barometer according to such a design, all the forces exerted for deflecting the same and for indicating a change in the atmospheric pressure are in the form of circular movements. The controlling forces produced by the aneroids are thus transmitted into a rotary movement practically without losses due to friction so that the measured value will be indicated without those errors which were unavoidable in barometers of the known types.

Still another advantage of the invention is that the annular spring which is mounted within the ring-shaped member considerably relieves the actual measuring system. This is a factor which contributes in obtaining the highest degree of measuring accuracy which is thus practically dependent only upon the atmospheric pressure to be measured.

Further objects, features, and advantages of the present invention will appear from the following detailed description thereof, as well as from the accompanying drawings, in which—

Fig. 3 shows a vertical cross section taken along line III—III of Fig. 1;

Fig. 4 is a diagrammatic illustration of the operation of the barometer;

Figure 1:
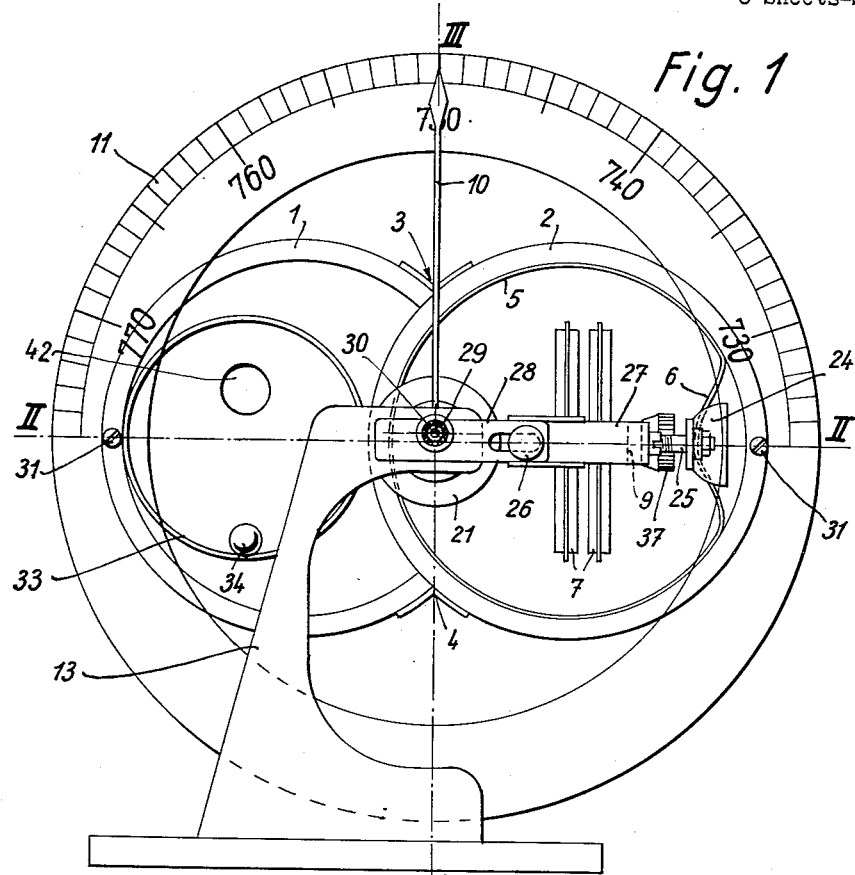
Fig. 1 shows a front view of a pressure gauge or barometer according to the invention.
Figure 7:
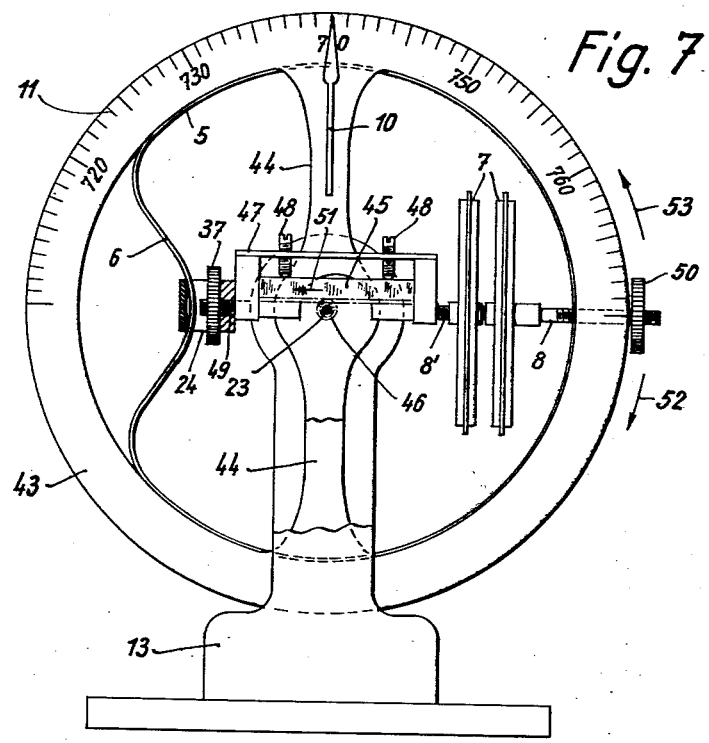
Figure 8:
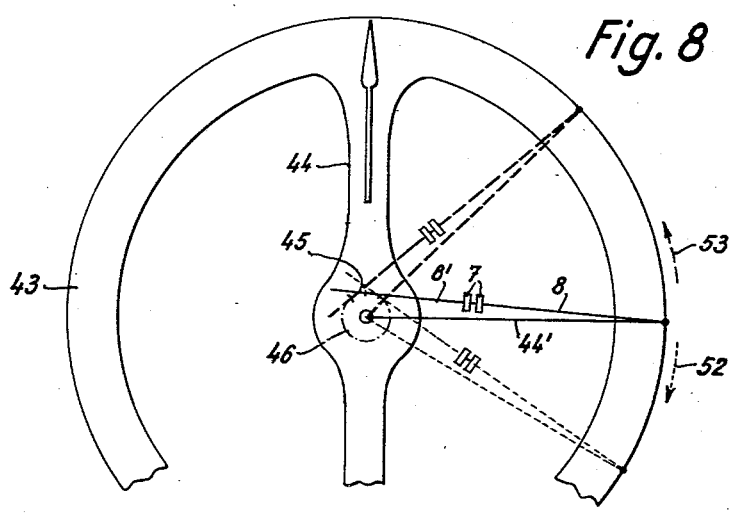
Figure 9:
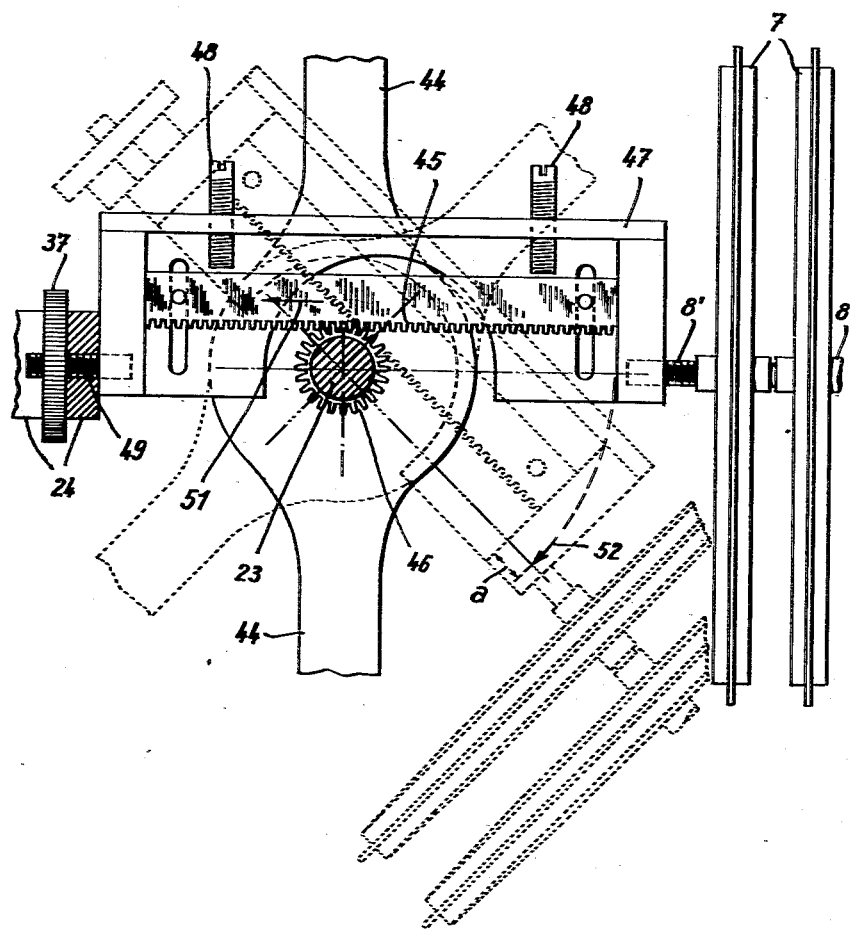

Figs. 7 and 8 are views similar to Figs. 1 and 4, respectively, of another modification of the invention; while Fig. 9 shows an enlarged detail view of the central elements of the embodiment as shown in Figs. 7 and 8.

Figure 2:
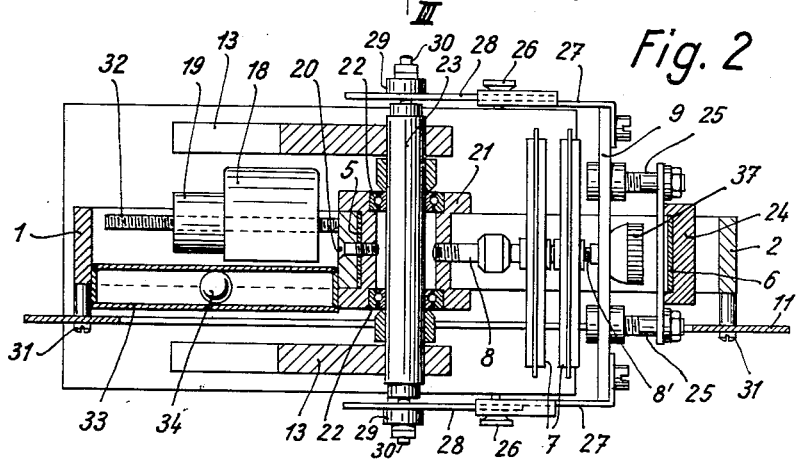
Fig. 2 shows a horizontal cross section taken along line II—II of Fig. 1.

Referring to the drawings, and first particularly to Figs. 1 to 3, the barometer according to the invention comprises a turnable means, such as a beam which may be formed, for example, of two ring-shaped members 1 and 2 which overlap each other and are rigidly secured to each other at their points of intersection 3 and 4. They are mounted by means of a screw 20 or the like on a bushing 21 which is mounted by ball bearings 22 on a horizontal shaft 23 so as to be easily rotatable thereon. An endless resilient steel band 5, the circumference of which is slightly larger than the inner periphery of the ring-shaped member 2 is inserted within the latter so that an inwardly projecting bulge 6 will be formed. The farthest inwardly projecting point of bulge 6 carries one end of a rod 8' which is secured thereto by connecting means including a cross bar 9, a mounting member 24 and two bolts 25. Rod 8' has, for example, two control aneroids 7 interposed therein and is connected to a rod 8, the free end of which is firmly screwed into bushing 21. Each end of cross bar 9 carries a pair of rods 27 and 28 constituting arms, the total length of which is adjustable by a setscrew 26 and the free end of which is rotatably mounted by means of a ball bearing 29 on a shaft 30 which is mounted eccentrically to shaft 23.

Rings 1 and 2 which form the beam carry an annular dial 11 which is secured thereto by two screws 31. If the barometric pressure changes, dial 11 moves, together with the double-ringshaped balance beam relative to a pointer 10 which is rigidly mounted on a pedestal 13.

For balancing the weight of the parts mounted within ring 2, ring 1 is provided with a counterweight 18 which is adjustable on a threaded bolt 25 by means of a nut 19.

The operation of the barometer as shown in Figs. 1 to 3 is illustrated in Fig. 4 and is primarily based upon the fact that rods 8, 8' and rods 27, 28 together with the eccentric mounting of rods 27, 28 on shaft 30 form an acute triangle, the base of which between points 23 and 30, as well as the side 27, 28 which remains constant, while the other length 8, 8' is variable by the insertion of aneroids 7. If, for example, side 8, 8' of the triangle should become longer as the result of a drop in atmospheric pressure, point 9 will be moved in the direction shown by arrow 35 to point 9a, while a rise in atmospheric pressure reduces the length of side 8 of the triangle and moves point 9 in the direction shown by arrow 36 to the position 9b. The bar 9, beam 1, 2 and dial 11 which is rigidly mounted thereon perform corresponding turning movements, so that the stationary pointer 10 will indicate the deflections of the dial and thus the changes in the atmospheric pressure.

For a very simple adjustment of the barometer, the outer end of rod 8' is provided with screw threads which engage with a knurled nut 37 on crossbar 9. Thus, when nut 37 is turned, the distance between crossbar 9 and shaft 23 may be adjusted and side 8, 8' of the triangle, as shown in Fig. 4, may be lengthened or shortened which results in a corresponding deflection of dial 11 relative to pointer 10 to permit a microadjustment of the barometer. For coarsely adjusting the beam to a state of balance, counterweight 18 may be adjusted by means of nut 19 on bolt 32.

In order to prevent the beam 1, 2 from becoming unbalanced due to the fact that a change in atmospheric pressure will cause a corresponding bulging of aneroids 7 and thus a change in distance of the parts within ring arm 2, such as crossbar 9, bolts 25, and mounting member 24, from shaft 23, ring arm 1 is provided with a suitable device for automatically compensating such displacement of the equilibrium and for restoring the same. This device consists of a flat annular container 33 which is mounted within, and extends in the same plane as ring 1, and a ball 34 which may be inserted into container 33 through a hole 42 in its side wall and which is capable of rolling along the inner peripheral wall of container 33. Due to its gravity, ball 34 will always assume the lowest possible position in container 33.

If, for example, due to a drop in atmospheric pressure, side 8, 8' of the triangle as shown in Fig. 4 will increase in length, it will force crossbar 9 upwardly and, for example, into the position 9a. However, since the distance between the parts which are disposed within ring arm 2, and the center of rotation, i.e. the axis of shaft 23, will at the same time be slightly increased, the weight torque of these parts on ring arm 2 will also increase, resulting in a displacement of the equilibrium in the opposite direction. Such displacement will, however, be compensated by the counteracting torque of ball 34, the distance of which from the axis of shaft 23 will then increase or decrease according to the increase or decrease in distance of the parts in ring arm 2.

Figure 5:
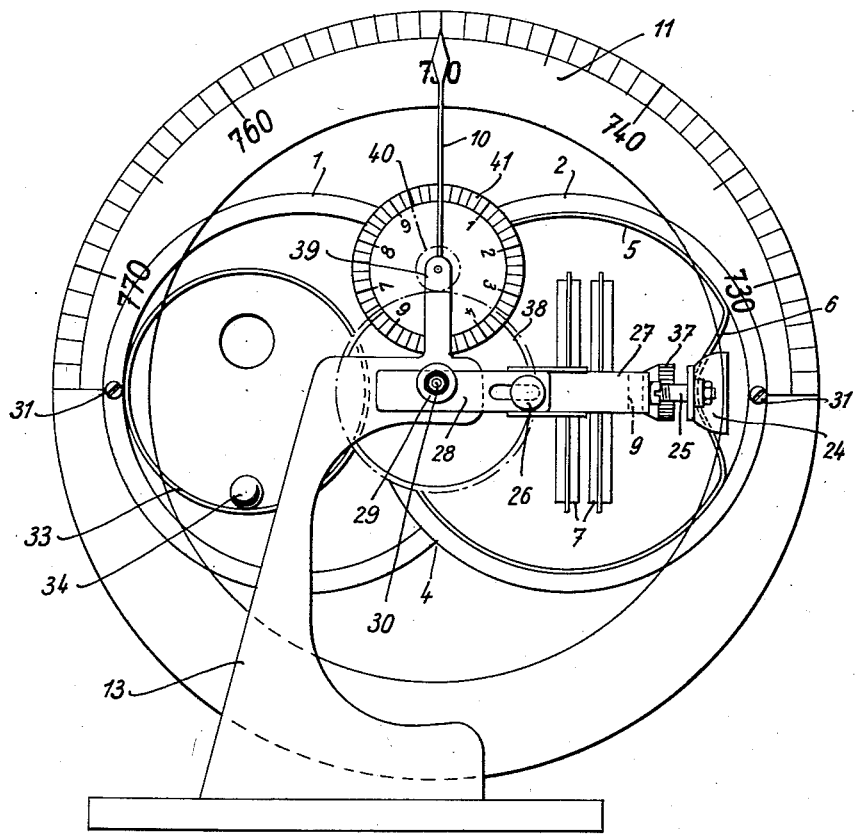
Figs. 5 and 6 are views similar to Figs. 1 and 3, respectively, of a modification of the invention which differs from the embodiment as shown in Figs. 1 to 3 merely by the provision of a second scale which, because of a suitable transmission, willl permit even the smallest variations of the prevailing atmospheric pressure to be read.
Figure 6:
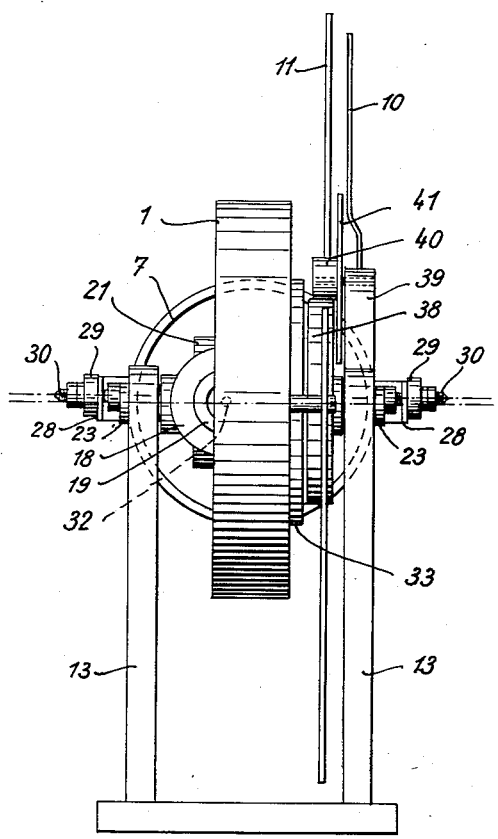

The modification of the invention as shown in Figs. 5 and 6 illustrates a further improvement which primarily consists in a more accurate readability of the variations in the atmospheric pressure. For this purpose, a gear or friction disk 38 is rigidly mounted on bushing 21 which carries the scale beam formed by rings 1 and 2, and this gear or friction disk 38 engages with another gear or friction roller 40 which is rotatably mounted on an extension 39 of the pedestal 13. The front side of gear or roller 40 carries a second dial 41 which thus turns at every deflection of the beam relative to the stationary pointer 10. The rate of transmission between dial 11 and dial 41 is preferably made so that each graduation on dial 11 will correspond to five or ten graduations on dial 41.

A further modification may consist in a replacing the rotatable dial 41 by a pointer which is rigidly connected to the shaft of gear or roller 40 and which then moves along a circular stationary dial of suitable size.

A barometer which is provided with a transmission as above described which operates free of any losses due to friction produces a reading of very high accuracy which permits differences in atmospheric pressure as low as 1 mm. to be measured along a dial range of a length which amounts to a multiple of such value.

An important feature of the invention also resides in the fact that the extent of the deflection of the barometer is not restricted to any particular degree of eccentricity of the axes 23 and 30 of rods 8, 8' and 27, 28 relative to each other. The smaller such eccentricity will be made, the larger will be the deflection of the dial relative to the pointer. The deflection will also be very stable since the adjustment of the beam will be produced by forces which will be automatically maintained in a state of equilibrium regardless of the position of the beam.

A third embodiment of the invention is illustrated in Figs. 7 to 9, in which rods 8, 8', the length of which is adjustable by the provision of aneroids 7, are provided with a rack which engages with a gear or gear rim, which is rigidly mounted on a stationary central shaft. As the result of the changes in length of rods 8, 8' caused by the changes in the atmospheric pressure, the rack will then roll along the gear by pivoting thereon and thereby deflect a ringshaped turnable means in one or the other direction.

In this embodiment, the beam consists of only one annular means 43 having an arm means 44 turnably mounted on a stationary shaft 23. Arm means 44 correspond to the rigid rods or arms 27, 28 of the first two embodiments, as shown in Figs. 1 to 6, and diagrammatically indicated in Fig. 8 by the numeral 44'. The variable rods 8, 8' which carry the aneroids 7 are provided at their end facing toward shaft 23 with a rack 45, as shown particularly in Fig. 9, which engages with a gear or gear rim 46 on the stationary shaft 23. In order to mount rack 45 so as to engage properly with gear 46, it is preferably mounted within a U-shaped yoke 47 so as to be adjustable by means of a pair of setscrews 48. Yoke 47, in turn, is connected at one side to bulge 6 of steel band 5 by means of a bolt 49, a nut 37, and the mounting member 24, and at the other side to turnable means 44, 43 by means of rod 8', aneroids 7, and rod 8. The outer end of rod 8 is provided with screw threads and a knurled nut 50 for adjusting the barometer.

The operation of the barometer as above-described is as follows:

If, for example, the atmospheric pressure drops, aneroids 7 follow the tension of bulge 6 of steel band 5 so that rack 45 will tend to move in the direction as shown by arrow 51. However, since rack 45 is in mesh with the stationary gear 46, ring 43 will be forced to turn in the direction shown by arrow 52, thereby permitting rack 45 to roll along gear 46. Thus, if in the illustration according to Fig. 9 the expansion of aneroids 7 has moved rack 45 a distance $a$ toward the left in the direction shown by arrow 51, the turnable means 43, 44 will thereby be forced to carry out a corresponding rotation in the direction of arrow 52 to the position indicated in dotted lines.

If, however, the atmospheric pressure increases, aneroids 7 will be compressed so that rack 45 will be moved in a direction opposite to that shown by arrow 51, whereby it will be forced to move along the stationary gear 46 in the opposite direction, thereby turning means 44, 43 in the direction shown by arrow 53.

Since the new barometer is based upon the principle of operation of a balance scale and the force produced by aneroids 7 is utilized substantially for no other purpose than to vary the direction of movement, and such force does not have to overcome an inner friction within the measuring system of an order of magnitude of the force required to produce an indication, even the least variation in atmospheric pressure will be indicated without any necessity of knocking or tapping on the instrument in order to overcome frictional jamming, as was necessary with metallic barometers of customary design, in which the measuring force could also only exert its action through an intermediate spring arm which necessarily results in a certain sluggishness and measuring inaccuracy of the barometer.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A barometer comprising a horizontal shaft having an axis, a means centrally mounted on said shaft and pivotable within a vertical plane relative to said shaft, said means being normally in a state of equilibrium and comprising a first arm at one side of said shaft, a second arm connected at its outer end with the outer end of said first arm and disposed at an angle to said first arm, at least one member mounted on one of said arms and being responsive to changes in the atmospheric pressure so as to vary the length of said one arm in accordance with such changes, the other arm when in operation being of constant length, the inner end of one of said arms being pivotally mounted on said shaft, means for pivotally mounting the inner end of the other arm at a point disposed eccentrically to said axis of said shaft, and indicating means operatively connected to said arms for indicating said changes relative to a stationary point.

2. A barometer comprising a horizontal shaft having an axis, a means centrally mounted on said shaft and pivotable within a vertical plane relative to said shaft, said means being normally in a state of equilibrium and comprising an arm at one side of said shaft, a second arm, means for connecting the outer ends of said arms, said arms being disposed at an acute angle to each other, at least one member mounted on one of said arms and being responsive to changes in the atmospheric pressure so as to vary the length of said one arm in accordance with such changes, the other arm when in operation being of constant length, the inner end of one of said arms being mounted on said shaft, means for mounting the inner end of said other arm at a point eccentrically to said axis of said shaft, said arms being turnable about the axis of said horizontal shaft, and indicating means connected to said connecting means for indicating said changes relative to a stationary point.

3. A barometer comprising a stationary horizontal shaft having an axis, a means centrally mounted on said shaft, said means being normally in a state of equilibrium and comprising an arm at one side of said shaft, a second arm, an annular member surrounding said arms, means for connecting the outer ends of said arms to each other and to said annular member, said arms being disposed at an acute angle to each other with the outer ends forming the apex of said angle, at least one member mounted on one of said arms and being responsive to changes in the atmospheric pressure so as to vary the length of said one arm in accordance with such changes, the other arm when in operation being of constant length, bearing means on said shaft and connected to said annular member for rotatably mounting the same for pivotal movement within a vertical plane relative to said shaft, means for connecting the inner end of one of said arms to said bearing means, means for pivotally mounting the inner end of the other arm at a point eccentrically disposed to said axis of said shaft, and indicating means on said annular member for indicating said changes relative to a stationary point.

4. A barometer comprising a stationary central horizontal shaft having an axis, a means comprising an arm and counter balancing means at opposite sides of said shaft and extending in different directions from said shaft, a second arm, a pair of annular members, one of said annular members surrounding said arms and the other annular member surrounding said counter balancing means, said annular members being offset relative to said shaft at opposite sides thereof, means for resiliently connecting the outer ends of said arms to each other and to its surrounding annular member, said arms being disposed at an acute angle to each other with the outer ends forming the apex of said angle, at least one member mounted on one of said arms and being responsive to changes in the atmospheric pressure so as to vary the length of said one arm in accordance with such changes, the other arm when in operation being of constant length, means for connecting said counter balancing means to its surrounding annular member, bearing means rotatable on said shaft, said annular members being connected to each other, and to said bearing means at the center of gravity of the structure formed by said connected annular members for rotatably mounting said structure formed by said annular members for pivotal movement within a vertical plane relative to said shaft, means for connecting the inner end of one of said arms to said bearing member, means for pivotally mounting the inner end of the other arm at a point eccentrically disposed to said axis of said shaft, and indicating means on said annular members for indicating said changes relative to a stationary point.

5. A barometer as defined in claim 4, wherein said resilient connecting means comprises a substantially annular band of spring steel mounted on the inner wall of its surrounding annular member and being drawn inwardly and away from said wall at one point so as to form an inwardly directed bulge, and means for connecting the outer ends of said arms to said bulge.

6. A barometer as defined in claim 1, further comprising means for adjusting the length of each of said arms independently of the other arm.

7. A barometer as defined in claim 1, said pivotable means further comprising counter balancing means at the other side of said shaft and including a container disposed within said vertical plane and having an arcuate inner wall, and a ball within said container and adapted to roll freely along said arcuate wall, said ball due to its gravity always assuming the lowest position on said wall at any pivoting position of said pivotable means for automatically compensating any state of unbalance produced by said arms and pressure-responsive means.

8. A barometer comprising a stationary shaft, bearing means on said shaft, and rotatable relative thereto, an annular means coaxial with said shaft and having at least one radial spoke mounted on said bearing means, an arm having one end mounted on said annular means and extending transversally thereof, at least one member mounted on said arm and being responsive to changes in the atmospheric pressure so as to vary the length of said arm in accordance with such changes, a substantially annular band of spring steel mounted on the inner wall of said annular means and being drawn inwardly and away from said wall at one point so as to form an inwardly directed bulge, means for connecting the other end of said arm to said bulge, a gear rim rigidly mounted on said stationary shaft, a rack forming a part of said arm intermediate said pressure-responsive means and said last connecting means and in mesh with said gear rim, said rack revolving around said gear rim when the length of said arm is being varied, and thereby pivoting said annular means in one or the other direction, and indicia on said annular means for indicating said changes relative to a stationary point.

9. A barometer as defined in claim 1, further comprising a second indicating means for indicating said changes more accurately than by said first indicating means, and means for transmitting the movement of said first indicating means to said second indicating means at a selected transmission ratio.

10. A barometer comprising, in combination, a support including a first pivot means; a beam means centrally mounted on said first pivot means for pivotal movement about an axis; a first arm extending in radial direction with respect to said axis and having an inner end and an outer end, at least said inner end being secured to said beam means for turning movement therewith; a rigid second arm extending at an angle to said first arm and having an outer end connected to the outer end of said first arm and an inner end located spaced from said axis and from said first arm in a direction transverse to said first arm, said first arm including a member responsive to changes in the atmospheric pressure for changing the length of said first arm in accordance with such changes; second pivot means fixed on said support eccentric to said first pivot means and supporting for turning movement said inner end of said second arm for effecting turning of said first arm and of said beam means about said first pivot means upon a variation of the length of said first arm; and indicating means including a member connected to said beam means for turning movement therewith, and a stationary member for indicating turned positions of said beam means.

11. A barometer comprising, in combination, a support including a first pivot means; bearing means rotatable on said pivot means; an annular means coaxial with said pivot means and having a radial rigid first arm mounted on said bearing means; a second arm having an outer end operatively connected to said annular means and extending transversely thereto and an inner end located spaced from said pivot means and from said first arm in a direction transverse to said first arm, said inner end of said second arm having a rack bar portion, said second arm including a member responsive to changes in the atmospheric pressure for changing the length of said second arm in accordance with such changes; and a gear fixed on said pivot means of said support coaxial with said pivot means, said gear meshing with said rack bar portion and supporting said inner end of said second arm for turning movement about said pivot means along the periphery of said gear for effecting turning of said first arm and of said annular means about said pivot means upon a variation of the length of said second arm; and indicating means including indicia on said annular means, and a stationary member for indicating turned positions of said annular means.

12. A barometer comprising, in combination, a support including a pivot means; a turnable means mounted on said pivot means for pivotal movement about an axis; a first arm extending in radial direction with respect to said axis and having an inner end and an outer end, at least said inner end being secured to said turnable means for turning movement therewith; a second arm extending at an angle to said first arm and having an outer end connected to the outer end of said first arm and an inner end located spaced from said axis and from said first arm in a direction transverse to said first arm, one of said arms including a member responsive to changes in the atmospheric pressure for changing the length of said one arm in accordance with such changes, and the other arm being rigid; spring means connecting said outer ends of said arms with said turnable means; means fixed on said support and supporting for turning movement said inner end of said second arm for effecting turning of said first arm and of said turnable means about said axis upon a variation of the length of said one arm; and indicating means including a member connected to said turnable means for turning movement therewith, and a stationary member for indicating turned positions of said scale means.

13. A barometer comprising, in combination, a support including a first pivot means; a turnable means mounted on said first pivot means for pivotal movement about an axis; a first arm extending in radial direction with respect to said axis and having an inner end and an outer end, at least said inner end being secured to said turnable means for turning movement therewith; a second arm extending at an angle to said first arm and having an outer end connected to the outer end of said first arm and an inner end located spaced from said axis and from said first arm in a direction transverse to said first arm, said first arm including a member responsive to changes in the atmospheric pressure for changing the length of said first arm in accordance with such changes, and said second arm being rigid; spring means connecting said connected outer ends of said arms with said turnable means; second pivot means fixed on said support eccentric to said axis and supporting for turning movement said inner end of said second arm for effecting turning of said first arm and of said turnable means about said axis upon a variation of the length of said first arm; and indicating means including a member connected to said turnable means for turning movement therewith, and a stationary member for indicating turned positions of said scale means.

14. A barometer comprising, in combination, a support including a pivot means having a pivot axis; a first arm having an inner and an outer end, the inner end of said first arm being supported on said pivot means for turning movement about said pivot axis; a second arm having an inner end located spaced from said pivot axis of said pivot means in a direction transverse to the extension of said first arm, and an outer end; connecting means connecting said outer end of said first arm with said outer end of said second arm; one of said arms including a member responsive to changes in the atmospheric pressure for changing the length of said one arm in accordance with such changes and the other arm being rigid; means fixed on said support and supporting for turning movement said inner end of said second arm for effecting turning of said first arm about said pivot axis upon a variation of the length of said one arm; and indicating means for indicating turned positions of one of said arms.

15. A barometer as defined in claim 14, further comprising means for manually adjusting the length of at least one of said arms.

16. A barometer as set forth in claim 14, wherein said connecting means is a ring member; wherein said outer end of said first arm is fixedly secured to said ring member; and wherein said outer end of said second arm is connected to said ring member at a point spaced from the outer end of said first arm.

17. A barometer comprising, in combination, a support including a pivot means having a pivot axis; a turnable means mounted on said pivot means for turning movement about said pivot axis; a first arm extending in radial direction with respect to said pivot axis and having an inner end and an outer end, at least said inner end being secured to said turnable means for turning movement therewith about said pivot axis; a second arm having an outer end operatively connected to said outer end of said first arm, and an inner end located spaced from said pivot axis of said pivot means in a direction transverse to the extension of said first arm; one of said arms including a member responsive to changes in the atmospheric pressure for changing the length of said one arm in accordance with such changes and the other arm being rigid; means fixed on said support and supporting for turning movement said inner end of said second arm for effecting turning of said first arm and of said turnable means about said pivot axis upon a variation of the length of said one arm; and a stationary member for indicating turned positions of said turnable means, said turnable means having indicia thereon.

18. A barometer as defined in claim 17, further comprising means for manually adjusting the length of at least one of said arms.

19. A barometer as set forth in claim 17 wherein said first arm extends at an acute angle to said second arm.

References Cited in the file of this patent

UNITED STATES PATENTS

| | | |
|---|---|---|
| 2,141,628 | Von Thyssen-Bornemisza | Dec. 27, 1938 |
| 2,366,566 | Shivers | Jan. 2, 1945 |
| 2,505,314 | Wallace | Apr. 25, 1950 |

FOREIGN PATENTS

| | | |
|---|---|---|
| 887,275 | Germany | Aug. 20, 1953 |